United States Patent [19]

Weber et al.

[11] Patent Number: 4,629,951
[45] Date of Patent: Dec. 16, 1986

[54] CONTROL SYSTEM FOR REVERSING THE ROTATION OF A FIELD WOUND MOTOR

[75] Inventors: Robert E. Weber; Ralph W. Carp, both of Newport News, Va.

[73] Assignee: Allied Corporation, Morris County, N.J.

[21] Appl. No.: 780,492

[22] Filed: Sep. 26, 1985

[51] Int. Cl.$^4$ ............................................. H02P 1/22
[52] U.S. Cl. ..................................... 318/300; 318/287; 318/296; 318/434
[58] Field of Search ............... 318/293, 294, 295, 296, 318/297, 298, 300, 432, 433, 434, 287, 288; 340/664; 361/23, 30, 31

[56] References Cited

U.S. PATENT DOCUMENTS

| | | | |
|---|---|---|---|
| 3,496,441 | 2/1970 | Heider et al. | 318/294 X |
| 3,564,365 | 2/1971 | Zelina | 318/300 X |
| 3,694,715 | 9/1972 | Van Der Linde et al. | 318/300 X |
| 4,327,391 | 4/1982 | Grzebielski | 361/87 X |
| 4,423,362 | 12/1983 | Konard et al. | 318/296 X |
| 4,427,928 | 1/1984 | Kuriyama et al. | 318/296 X |
| 4,447,768 | 5/1984 | Terui | 318/293 |
| 4,553,187 | 11/1985 | Burns et al. | 361/31 X |

FOREIGN PATENT DOCUMENTS

| | | | |
|---|---|---|---|
| 5728506 | 2/1982 | Japan | 318/293 |
| 0930549 | 5/1982 | U.S.S.R. | 318/296 |

Primary Examiner—Charles D. Miller
Assistant Examiner—Bentsu Ro
Attorney, Agent, or Firm—Russel C. Wells; Markell Seitzman

[57] ABSTRACT

A control system for reversing the rotation of a field wound motor is used in electric power steering systems. The system responds to control signals from a control means 25 to energize opposite legs of a bridge circuit 14 to direct current through the field winding 10 in the correct direction. At the same time the armature winding is energized. The control system provides a failure detection means 18 for the checking of the various control signals and the operation of the system to determine if there is any system failure to provide for a failsafe operation.

4 Claims, 5 Drawing Figures

CONTROL SYSTEM FOR REVERSING THE ROTATION OF A FIELD WOUND MOTOR

FIELD OF INVENTION

This invention relates to control systems for reversing the rotation of field wound motors in general and more particularly to a power control and fault detection system for a field wound motor.

BACKGROUND OF INVENTION

The particular application of the preferred embodiment of the present invention is in the application of electric motors to power steering systems for motor vehicles. Most power steering systems are hydraulic and as such require large amounts of power from the engine. Electric power steering systems use a reversible electric motor as the prime mover and as such the horsepower drain from the engine is reduced.

It is a particular advantage of this invention to provide a control system for reversing the rotation of the electric motor. In addition it is an another advantage of the control system to provide failure detection modes which are communicable to the vehicle operator notifying him to take any necessary service steps.

These and other advantages are found in a control system for reversing the rotation of a field wound motor having a field winding and an armature winding, each electrically connected at one end to a source of electric power. A control means generates control signals to select the rotation of the motor and to energize the armature winding. An armature power driver circuit is electrically connected to the armature winding and responds to one of the control signals to energize the armature winding to control the flow and amount of current through the armature winding. A field winding power driver is electrically connected in a bridge circuit with the field winding across the center of the bridge. The field winding power driver is responsive to another of the control signals to select the rotation of the motor by controlling the direction and amount of the flow of current through the motor field winding.

The several control signals applied to the control system are compared with the results of the system and if there is not concurrence, a failure signal is generated. The utilization of the failure signal is under the control of the overall electric power steering system control.

These and other advantages will become apparent from the following detailed description taken in conjunction with the drawings.

DETAILED DESCRIPTION OF THE DRAWINGS

Figure 1:
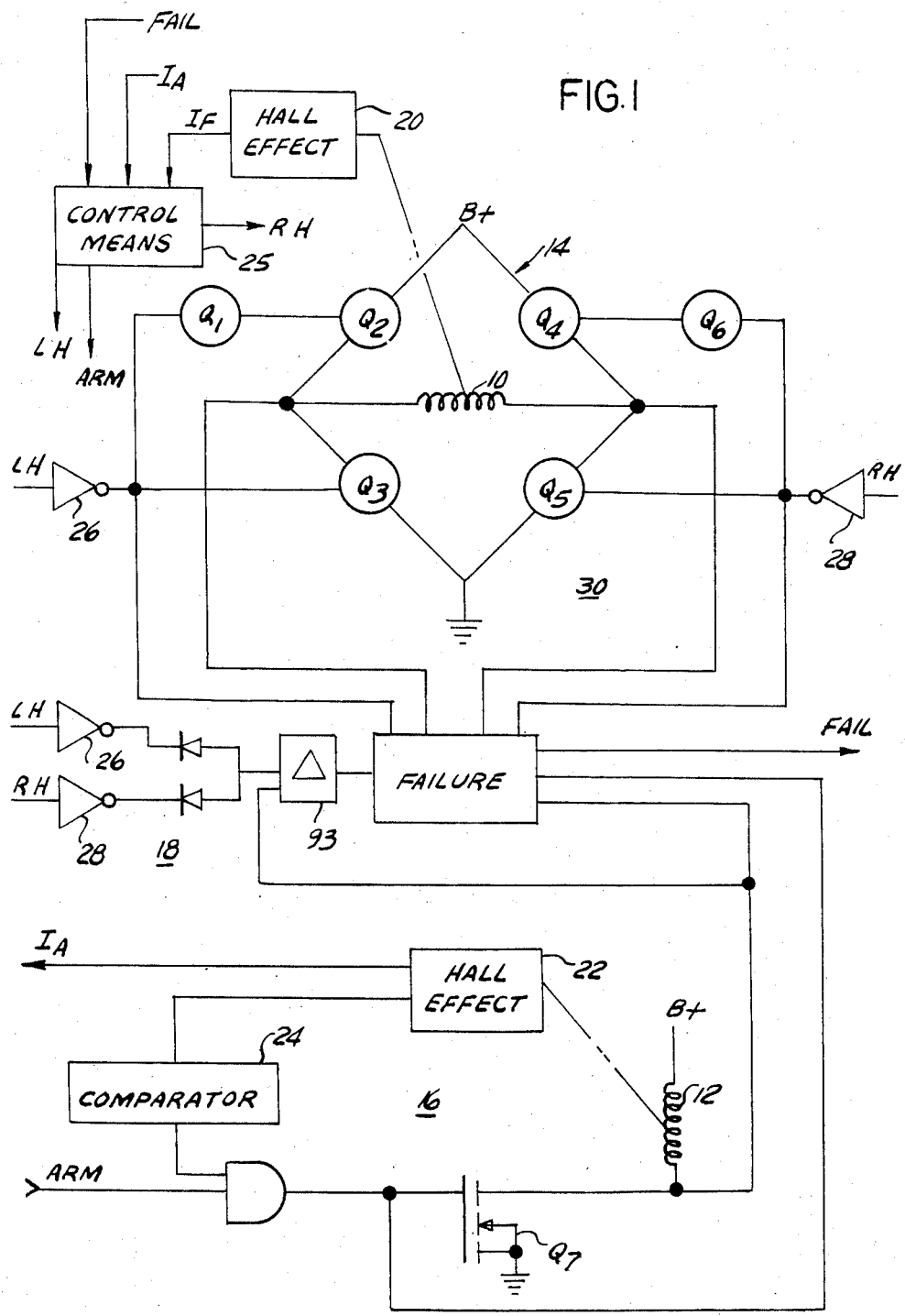
Figure 2:
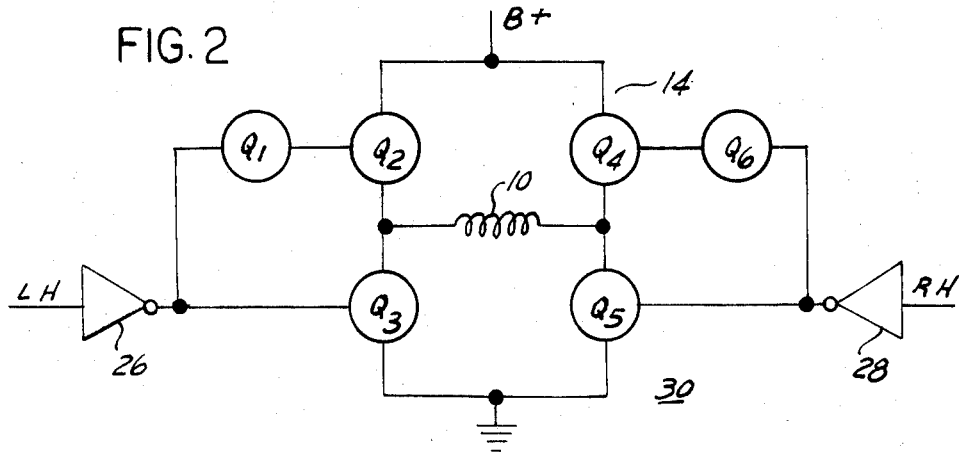
Figure 3:
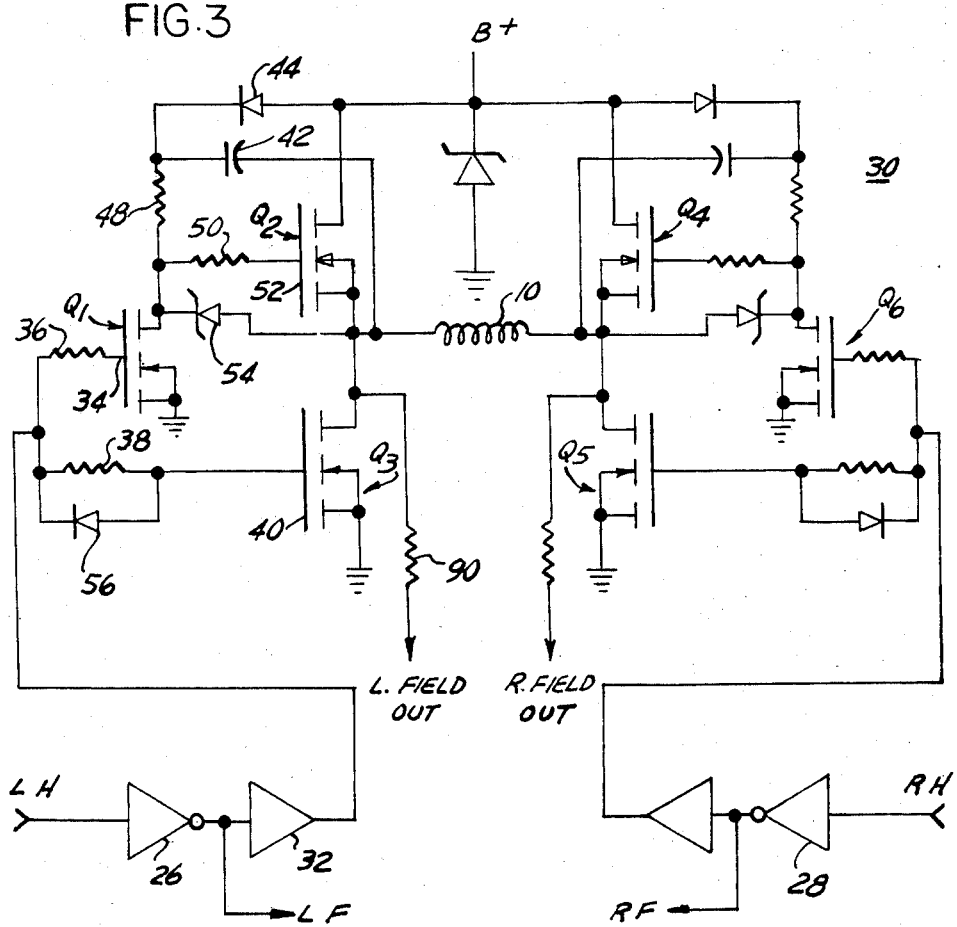
Figure 4:
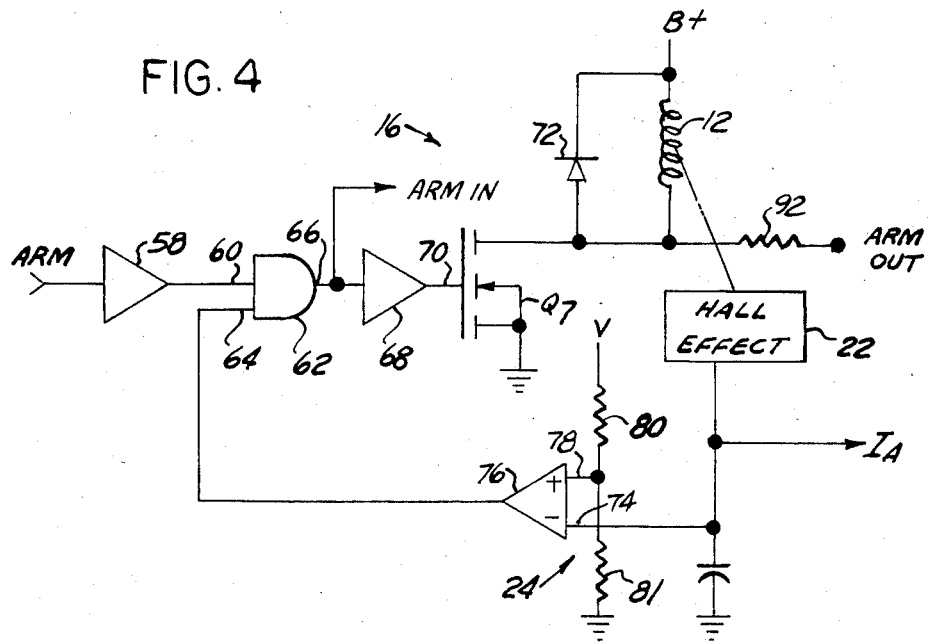
Figure 5:
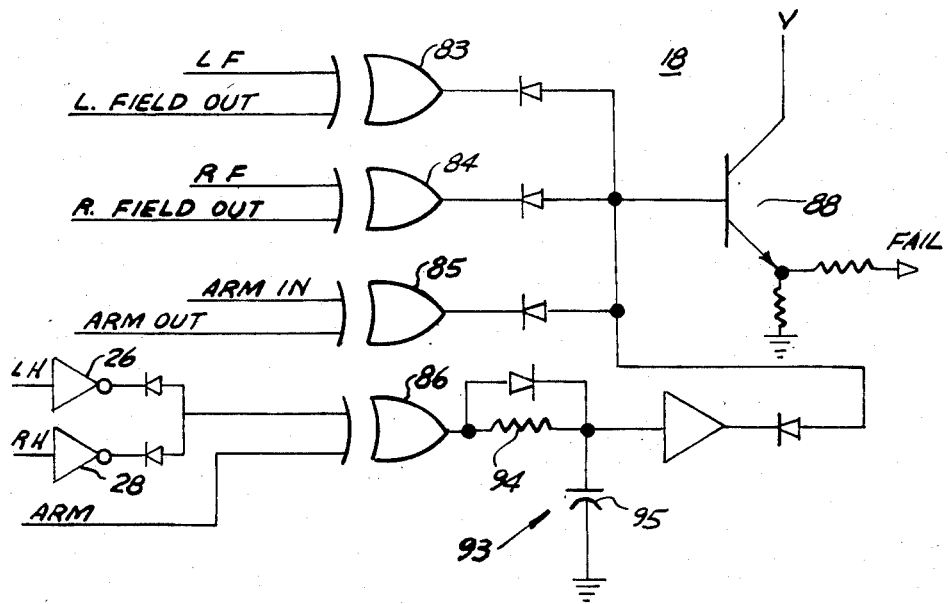

FIG. 1 is a block schematic of the control system.
FIG. 2 is a block schematic of the field power driver means of the control system of FIG. 1.
FIG. 3 is a schematic of the field power driver means of FIG. 2.
FIG. 4 is a schematic of the armature power driver means of the control system of FIG. 1.
FIG. 5 is a schematic of the failure detection circuit of the control system of FIG. 1.

DETAILED DESCRIPTION OF THE PREFERRED EMBODIMENT

Referring to the FIGURES there is illustrated both in block diagrammic form and in schematic form, a control system for reversing the rotation of a field wound motor. In particular, FIG. 1 illustrates a field winding 10 and an armature winding 12 connected in a control circuit. The field winding 10 is connected in a bridge circuit 14 with four power transistors, Q2, Q3, Q4, and Q5, respectively, connected in each leg. Two of the bridge leg power transistors Q2 and Q4 are controlled respectively by power transistors Q1 and Q6. In the preferred embodiment all of the power transistors are N channel field effect (FET) enhancement mode transistors.

Also illustrated in FIG. 1 are the armature power driver means 16 and a failure detection means 18. Connected to the field winding 10 is a Hall-effect device 20 which generates a signal proportional to the field current $I_F$. Connected to the armature winding 12 is a second Hall-effect device 22 which generates a signal porportional to the armature current $I_A$ and provides this signal to a comparator means 24 for controlling the maximum amount of armature current.

In FIG. 1, the signal LH which is a pulse signal is applied to both power transistors Q1 and Q3. This signal, LH, in the nomenclature of electric power steering, signifies left turn or left field which is either a clockwise or counter-clockwise rotational direction. Similarly the signal RH signifies right turn or right field which is the opposite rotational direction. When the signal LH is applied to power transistor Q1 and Q3, it turns off Q1 and Q3 and turns on Q2. With no RH signal on the input lead to power transistors Q5 and Q6, power transistors Q5 and Q6 are on. Therefore current flows from B+ through power transistor Q2, the field winding 10 and the power transistor Q5 to ground. This conditions the motor to rotate for a left turn.

In a similar manner, the power transistors Q4, Q5 and Q6 function with a pulse signal RH. Simultaneously with the application of either the LH or the RH signals, the control means 25 generates a signal, ARM, to energize the armature winding 12.

Referring to FIG. 2 there is shown in schematic form the field power driver means 30 comprising the six power transistors Q1–Q6, the field winding 10 and a pair of inverters 26,28 for inverting the input signals LH and RH. As is illustrated, the field winding 10 is connected across the arm of the bridge circuit which has the power transistors Q2, Q3, Q4, and Q5 in the legs. In the bridge circuit 14, the opposite legs must conduct if any current is to flow through the arm of the bridge circuit 14.

The following table illustrates the operation of the field power driver means 30. For the operation, a high signal on $L_H$ or $R_H$ indicates that the field winding 10 should be actuated.

| LH | RH | Q1  | Q2  | Q3  | Q4  | Q5  | Q6  |
|----|----|-----|-----|-----|-----|-----|-----|
| L  | L  | On  | Off | On  | Off | On  | On  |
| H  | L  | Off | On  | Off | Off | On  | On  |
| L  | H  | On  | Off | On  | On  | Off | Off |
| H  | H  | Off | On  | Off | On  | Off | Off |

Referring to FIG. 3, there is shown the electrical schematic of the field power driver means 30 of FIG. 2. Consider that the control means 25 generates a control signal selecting the rotation of the motor to be such that the direction of the motor vehicle turn is to be left. The signal LH is a positive going pulse width and is applied through an inverter 26 and then an amplifier 32. The output LF of the amplifier 32 is a low signal which is applied to the gate 34 of the power transistor Q1 through a gate resistor 36. This will cause the power transistor Q1 to turn off. At the same time, the output of the amplifier 32 is applied through another gate resistor 38 to the gate 40 of the power transistor Q3, turning that power transistor Q3 off.

However, while the power transistors Q1 and Q3 were turned on, a capacitor 42 was charged through a diode 44 to the value of the supply voltage B+. The other end of the capacitor 42 is connected through the power transistor Q3 to ground. The junction of the source resistor 48 for the power transistor Q1 and the gate resistor 50 for the power transistor Q2 is at ground potential, therefore holding the power transistor Q2 off.

When the power transistor Q1 is turned off, the voltage at the gate 52 of the power transistor Q2 is brought to B+ which functions to turn the power transistor Q2 on. When the power transistor Q3 turns off, the voltage at the end of the capacitor 42 connected to the power transistor Q3 is now moved positive. The charge on the capacitor 42 moves above the supply voltage B+, reverse biasing the diode and applying the boosted voltage to the gate 52 of the power transistor Q2. This causes the power transistor Q2 to turn on hard and the power dissipation across the transistor is at a minimun. A zener diode 54 is placed in the circuit to clamp the boost voltage and prevent rupture of the gate oxide. Because the impedance of the gate 52 of the power transistor Q2 and the zener diode 54, operating below the zener voltage, is high, the boosted voltage charge remains on the capacitor 42 for a significant period of time. This significant period of time is such that it will remain for the longest pulse found in the electric power steering system. It is a requirement of the system, that the duty cycle of any of the input pulses, LH and RH must be no greater than about 96% in order to have the capacitor 42 recharge.

The gate resistor 38 to the power transistor Q3 functions with the normal gate capacitance of the power transistor to delay the turning on of the power transistor Q3 while the power transistor Q2 is on to prevent a short circuit. The delay allows the power transistor Q2 to be turned off before the power transistor Q3 is turned on. However, when the power transistor Q3 is on, the diode 56 shunting the gate resistor 38 operates to reduce the effect of the delay and turns the transistor Q3 off.

Under normal operation only one of the input signals LH or RH is high and the other is low. This will cause the motor to rotate in only one direction. In the explanation above, the signal LH is high to turn on the power transistor Q2 and the signal RH is low to turn on the power transistor Q5. Thus, current flows through the field winding 10 in such a direction to cause the motor to rotate to turn the vehicle to the left.

When both of the input signals are low, the two power transistors Q3 and Q5 are on and the field current in the field winding 10 continues to circulate as the magnetic field created in the field winding collapses. This happens because current can flow in either direction through a FET.

Since the circuit of FIG. 3 is symmetrical, the control signal RH causes the power transistors Q4, Q5 and Q6 to operate in the same manner as the control signal LH controls the power transistors Q1, Q2 and Q3.

As illustrated in FIG. 1, there is a Hall-effect device 20 in the field winding 10 to measure the amount of field current. The Hall-effect device 20, in response to the amount of field current, will generate a voltage signal which is supplied to the motor control logic in the control means 25.

Referring to FIG. 4, there is illustrated a schematic of the armature power driver means 16. A control signal, ARM, from the control means 25 is a pulse signal that is applied to an input amplifier 58. This signal is typically generated coincident with either the LH or the RH signal. This control signal, ARM, functions to energize the armature winding 12 by causing current to flow therethrough.

The output of the amplifier 58 is connected to an input 60 of a NAND gate 62 which has as its other input 64 the output signal of the comparator means 24 which compares the armature current with a fixed maximum value of current. The output 66 of the NAND gate 62 is connected through an amplifier 68 to the gate 70 of a plurality of parallel connected FETs shown in the FIGURE as one FET Q7. The number of parallel FETs is dependent upon the amount of armature current required. When the control signal ARM is driven low, the armature winding shunt diode 72 allows the current generated by the magnetic field created in the armature winding 12 to dissipate as the field collapses.

The second Hall-effect device 22 is connected to the armature winding 12 to measure the amount of armature current. The Hall-effect device 22 generates a voltage signal in proportion to the amount of current flowing through the armature winding 12. This signal $I_A$ is supplied to the inverting input 74 of operational amplifier 76 in the comparator means 24. The non-inverting input 78 is connected to a voltage divider network comprising a pair of resistors 80,81 connected in series between a source of voltage, V, and ground. It is the function of the comparator means 24 to generate a high level output when the armature current is below a certain level and to generate a low level output when the armature current is above a certain level. In each case the levels are reflected by voltage levels from the Hall-effect device 22 and the voltage divider network 80–81.

The motor control system of FIG. 1 has means within the system to provide failure detection and as a result, the system can generate signals to the motor control logic in the control means 25 to allow either the operator or a computer program to take the necessary corrective action. FIG. 5 is a schematic of the logic of the failure detection means 18 and has a plurality of Exclusive OR gates 83,84,85,86 connected in an OR circuit to an amplifier transistor. In the preferred embodiment, as shown in FIG. 5, the logic states that the FAIL signal is low when there is a failure; i.e., the transistor 88 is not conducting. The first Exclusive OR gate 83 has on its two inputs, the control signal $L_F$ from an inverter 26 and a signal from the junction of the power transistors Q2 and Q3 called L FIELD OUT. The logic determines if the polarity of these two signals are the same and if so, there is a failure. The control signal $L_F$ calls for the rotation of the motor in a predetermined rotation and the signal L FIELD OUT, which is supplied through a resistor 90 from the high voltage side of the field winding when the current flows through the field winding 10 in the correct direction to have the motor rotate in the predetermined direction of rotation, indicates the proper direction of current flow through the field winding 10. If the output of the Exclusive OR gate 83 is low, indicating that both inputs are the same polarity, the amplifier 88 is not turned on indicating a failure.

In a similar manner, the control signal $R_F$ and the signal R FIELD OUT are tested to determine if the circuit is responding correctly. This testing is through the second Exclusive OR Gate 84.

Likewise the armature power drive means 16 logic is checked. The signal ARM IN from FIG. 4 is the signal which is applied, through an amplifier 58, to the gate 70 of the armature FETs Q7 to drive the current through the armature winding 12. The other signal to the Exclusive OR 85 is the signal taken from the armature winding 12 through a resistor 92. Again, if the signals are of the same polarity, there is an error. If the armature winding 12 is energized, the voltage level on the resistor 92 from the armature winding 12 is at ground.

The last signals to be checked by the failure detection means 18 are to make sure that if a rotation is called for, the armature winding 12 is energized. The output of this fourth Exclusive OR Gate 86 is supplied to a delay 93 comprising a resistor 94 capacitor 95 network to allow for the phase and pulse width differences between the field and armature signals. Thus if the left field input, LH, is high and the right field input, RH, is high, the armature must be off.

The outputs of each of the Exclusive OR gates 83–86 are "ored" together and if any of the outputs are low, the transistor amplifier 88 is turned off and the output from the emitter lead is low indicating a failure.

There has thus been described a control system for reversing a field wound motor including several logic gates for checking the logic to the control system. The control system, in its preferred embodiment, is found in a microprocessor controlled system for a motor vehicle and in particular is used in an electric power steering system.

What is claimed is:

1. A control system for reversing the rotation of a field wound motor comprising:
    a field winding;
    an armature winding;
    control means for generating clockwise or counterclockwise field control signals to energize said field winding to select the rotation of the motor and an armature control signal to energize said armature winding;
    field power driver means electrically connected in a bridge circuit with said field winding and responsive to said field control signals for controlling the direction of the flow of current through said field winding, said field power driver means including means for generating a current signal indicating the direction of actual current flowing through said field winding;
    armature power driver means electrically connected to said armature winding and responsive to said armature control signal for energizing said armature winding for controlling the flow of current through said armature winding and including means connected to said armature winding for generating a current signal indicating current flowing through said armature winding; and
    exclusive OR failure detection means for generating a signal in response to a logical combination of said field control signals, said armature control signal, said current signal from said field power driver means and said current signal from said armature power driver means to indicate proper concurrence of said signals.

2. A control system for reversing the rotation of a field wound motor according to claim 1 wherein said field power driver means includes a first Hall-effect device operatively coupled to said field winding for generating a signal proportional to the amount of field current in said field winding and said armature power driver means includes a second Hall-effect device operatively coupled to said armature winding for generating a signal proportional to the amount of current through said armature winding.

3. A control system for reversing the rotation of a field wound motor according to claim 2 wherein said signal from said first Hall-effect device is compared with the desired amount of current to be supplied to the field winding.

4. A control system for reversing the rotation of a field wound motor according to claim 2 wherein said signal from said second Hall-effect device which is proportional to the amount of current through said armature winding is feedback and compared with a predetermined value representing the desired amount of current flowing through said armature winding for controlling the amount of current flowing through said armature winding.

* * * * *